July 12, 1938.    B. B. KAHN ET AL    2,123,699
STOVE
Filed April 13, 1936    3 Sheets-Sheet 1

Inventor
Bertrand B. Kahn and
Carl J. Hake

By
Maréchal & Noe
Attorneys

July 12, 1938.   B. B. KAHN ET AL   2,123,699
STOVE
Filed April 13, 1936   3 Sheets-Sheet 2
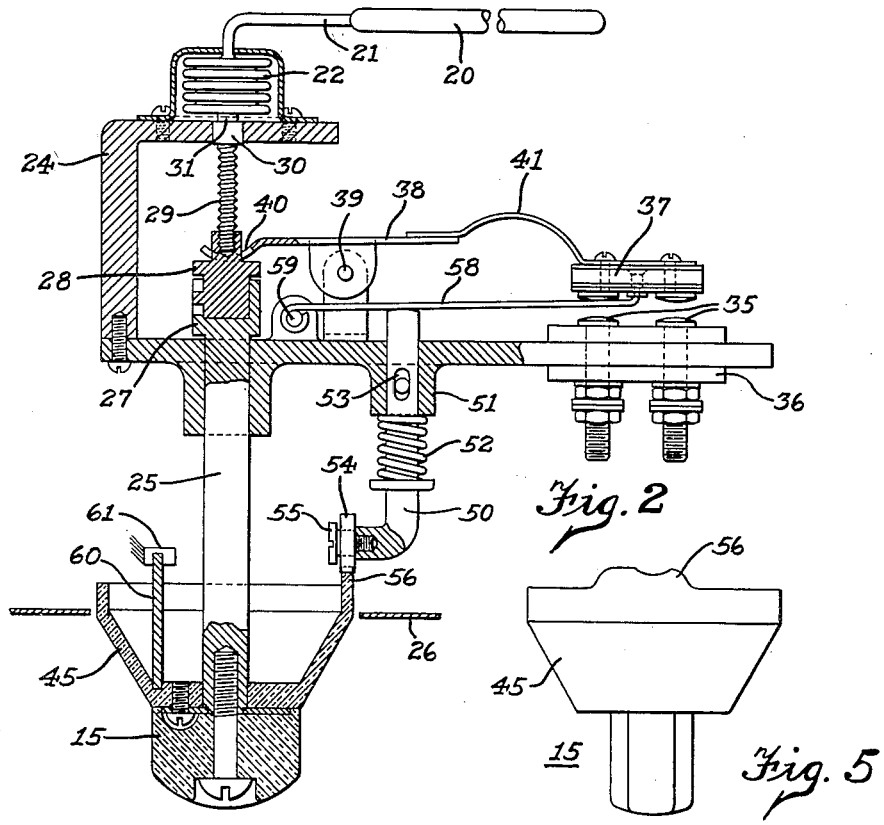
Fig. 2
Fig. 5
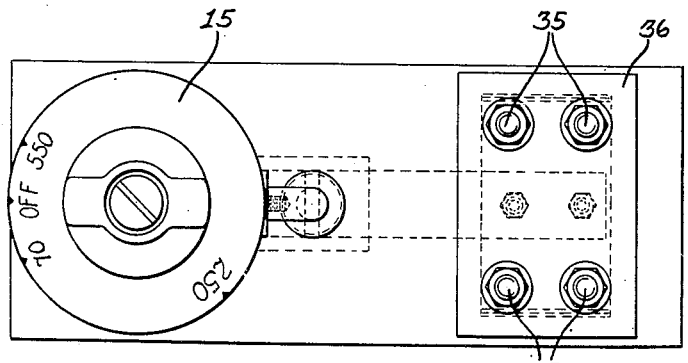
Fig. 3
Inventor
Bertrand B Kahn and
Carl J. Hake
By Maréchal & Noe
Attorneys July 12, 1938.                B. B. KAHN ET AL                2,123,699
                                  STOVE
                          Filed April 13, 1936           3 Sheets-Sheet 3
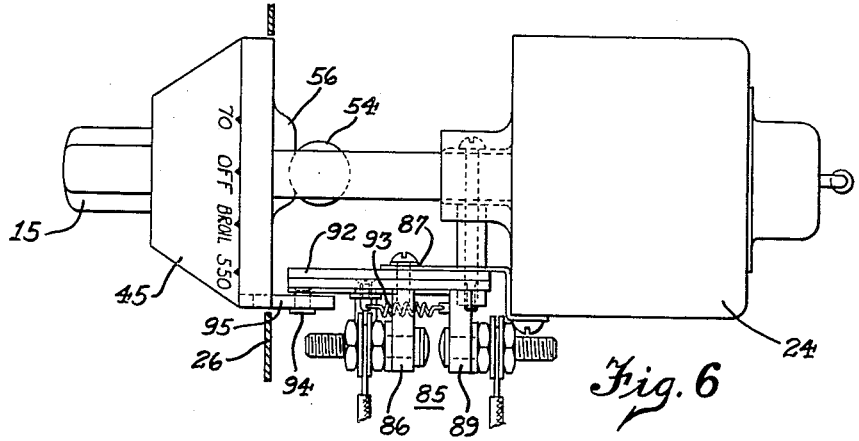
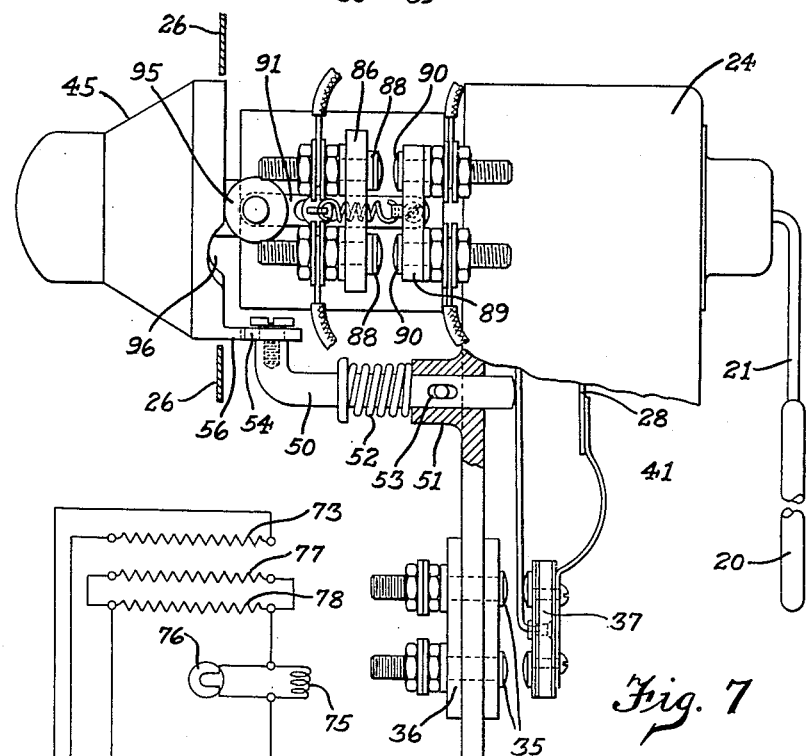
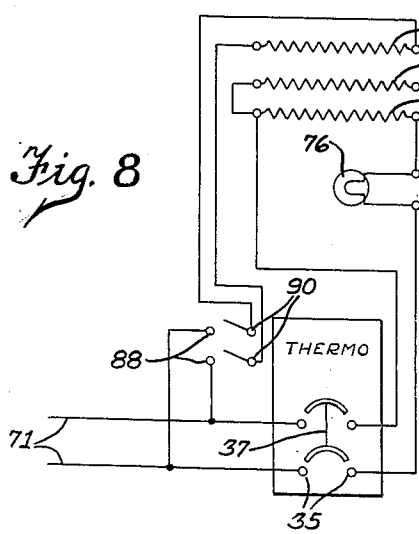
INVENTOR
Bertrand B Kahn and
Carl J Hake
BY
Marechal & Noe
ATTORNEYS Patented July 12, 1938

2,123,699

UNITED STATES PATENT OFFICE 2,123,699

STOVE

Bertrand B. Kahn, Cincinnati, and Carl J. Hake, Hamilton, Ohio, assignors to The Estate Stove Company, Hamilton, Ohio, a corporation of Ohio Application April 13, 1936, Serial No. 74,037

9 Claims. (Cl. 219—20)

This invention relates to heating appliances and more particularly to control means for regulating an oven of a stove.

It is the principal object of the invention to provide a simple and effective means for controlling the oven temperature and for insuring the de-energization of the range when desired.

It is a further object to provide a single control means for controlling the energization and de-energization of the heating elements to provide for positive de-energization thereof when desired, and also for the regulation of the oven temperature over a desired range.

It is a further object to provide simple and effective means operable in different positions for controlling selectively the energization and de-energization of an oven baking element, and in other positions for regulating the oven temperature.

It is a still further object to provide a thermostatically controlled switch means for the oven baking elements, and additional means providing for maintaining the thermostatic switch means positively in open circuit position when desired regardless of temperature conditions.

Other objects and advantages will be apparent from the accompanying drawings, the description, and the appended claims.

In the drawings,—

Fig. 2 is a sectional fragmentary view showing the thermostatic switch and its control mechanism;

Fig. 3 is an end elevational view of the thermostatic and control device;

Fig. 5 is a detail view in elevation showing the control dial;

Fig. 6 is a plan view of a somewhat modified form of apparatus;

Fig. 7 is a side elevational view of the same form of apparatus with parts broken away; and Fig. 8 is a circuit diagram of the modified arrangement.

Figure 1:
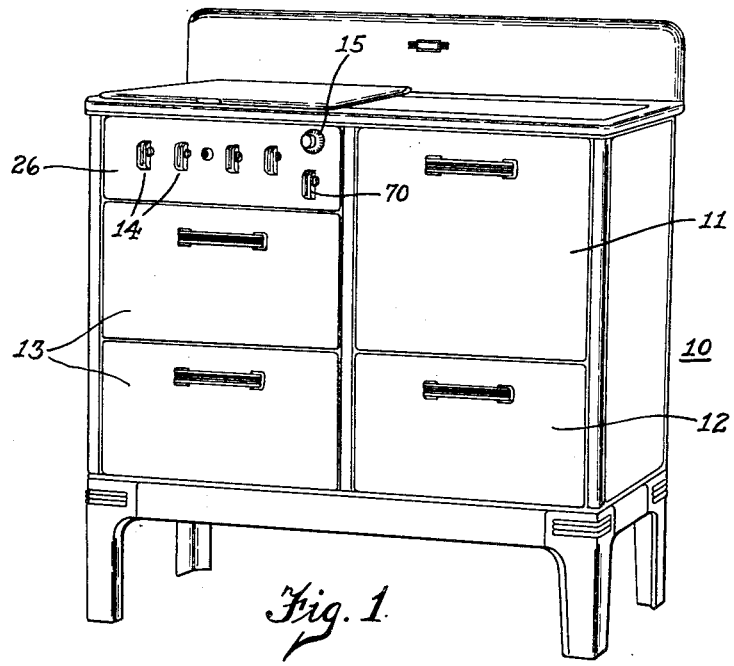
Fig. 1 is a view of a stove representative of that described herein.
Figure 4:
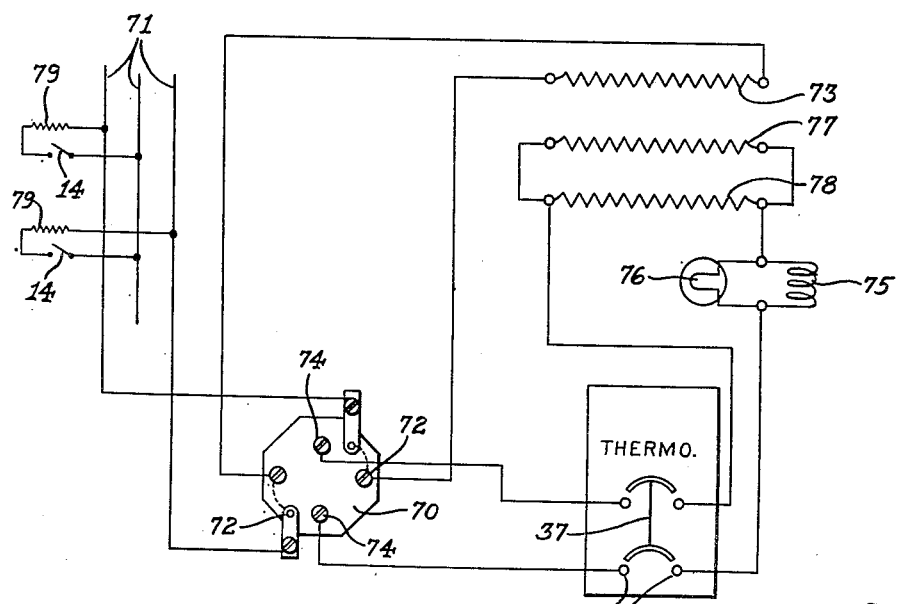
Fig. 4 is a diagrammatic showing of the circuit for energizing the heating elements and the control means therefor.

Referring to the drawings which disclose a preferred embodiment of the invention, the stove is shown generally at 10, and embodies the usual oven compartment 11, a broiler compartment 12, and utensil compartments 13. A plurality of cooking top elements are provided which are controllable by means of the switch means 14. The oven mechanism is controlled by means of the control member 15 which is mounted in a convenient location upon the face of the stove. These elements of course are shown merely as illustrative of any desired arrangement or structure of the stove.

A thermostatic control device is provided for regulating the temperature within the oven to predetermined desired temperatures. This thermostatic device is associated with the control knob 15, and comprises a temperature responsive element 20 adapted to be positioned in a suitable location within the oven preferably in the upper portion and adjacent the top thereof. This element as shown is of the fluid actuating type, and connects by means of a tube 21 with a bellows 22 adapted to be expanded and contracted in response to the temperature condition of the heat responsive element.

The bellows 22 is mounted upon a frame structure 24 which also serves to rotatably support a shaft 25 upon the outer end of which the control knob 15 is mounted. As shown the shaft and control knob extend outwardly through an aperture in the frame or outer decorative plate structure 26 of the stove front, preventing undesired access to the control mechanism from the front of the stove. The shaft at its inner end is provided with an enlarged head 27 within which there is movably positioned an internally threaded nut 28, the arrangement being such that nut 28 is caused to rotate upon rotation of the shaft, but limited axial movement of the nut 28 with respect of the head 27 is permitted. A screw threaded member 29 has engagement with the nut 28, and is also formed with a non-circular portion 30 having engagement in the housing section 24 such as to prevent rotation while permitting axial movement thereof. The extremity of the shaft is provided with a bearing piece 31 adapted to engage with the end of bellows 22. This construction is such that as shaft 25 is turned, nut 28 is also turned, and member 29 being held against rotation is moved axially toward and away from the end of the bellows.

The frame structure 24 also carries a plurality of fixed contacts 35. There are preferably four of these contacts all mounted on insulating block 36 and arranged in groups as shown, this arrangement providing for the breaking of both sides of the line upon operation of the switch. If desired only one set of contacts may be used to effect the breaking of only one side of the line, but in view of the requirements of the Underwriters' Laboratories as to the complete disconnection of the circuit from both sides of the line, this structure comprising the double set of contacts is preferably used.

The movable contact members 37 comprising two pairs of contacts, the contacts of each pair being connected together, are suspended from an arm 38 pivotally supported at 39 upon the frame structure. At its upper end this arm 38 carries a bifurcated extension 40 adapted to engage the end of nut 28, and to be operated in response to movement thereof to cause the pivoting of the arm about its support to close or open the contacts. A ribbon spring structure 41 preferably supports the contact assembly from arm 38, permitting limited movement of the contact structure 37 with respect to the arm 38.

In accordance with the temperature conditions within the oven, and the setting of the control dial 15 with reference thereto, the arm 37 is caused to either open or close the contacts. That is, with the control member 15 set in any predetermined position, the contacts are closed until the temperature within the oven has risen sufficiently to cause expansion of bellows 22. Upon such expansion the end of the bellows bears against stud 29 which in turn effects axial movement of the nut 28 within head 27, with the resultant pivoting of the contact assembly into open circuit position. Upon a fall in the oven temperature, bellows 22 contracts, stud 29 and member 28 move toward the bellows, causing pivotal movement of arm 38 about its support to close contacts 37 upon contacts 35, closing and energizing the electrical circuit. As is well understood rotation of control member 15 provides for the setting of the thermostat device effecting a different initial spacing between the stud and bellows so that this operation occurs at different predetermined temperature conditions within the oven.

The different operative positions of the control member are marked upon the dial 45 thereof and cooperate with a suitable fixed mark or indication suitably positioned upon a part of the stove such as plate 26 for indicating to the operator the setting of the member. In addition to temperature indication covering the desired range (such as 250° to 550° F.) the dial also is provided with a setting position which corresponds substantially to room temperature. This position is indicated on the dial by the designation "70". The position of the dial 45 with respect to shaft 25 is so adjusted that when the index points to the "70" position, the thermostatic switch is just closing when the oven is at normal room temperature, and this position thus serves as a means for setting the thermostat to maintain the actual conditions within the oven in accordance with the setting shown upon the dial. It will be understood that any other suitable temperature or range of temperatures may be marked and used for checking purposes. There is also provided an off position which is located beyond this 70 position in the direction of lower temperature setting for the thermostatic element, at which point under normal conditions the oven circuit remains disconnected. However this operation does not comply with certain fire and safety regulations because of the possibility of the thermostatic switch, under abnormal temperature conditions, effecting the closing of the circuit when not desired, and with the control member remaining in off position.

Accordingly there is provided herein a means for positively and definitely assuring that the heating elements will be disconnected when desired. This means comprises a mechanically operated mechanism for positively effecting the opening of the circuit. It is preferably associated with the same control member that effects regulation of the thermostat device, and is so adjusted that in the limiting or off position of the thermostat this mechanism is actuated to assure the positive opening and locking open of the contacts which control the oven circuit. Thus means are definitely provided for maintaining the circuit in open position irrespective of any changes that may occur in the temperature condition to which the thermostat itself is responsive.

This means comprises a plunger 50 which is slidably mounted in an upstanding boss 51 upon the frame structure 24, extending therethrough as shown. Spring 52 tends to normally move the pin outwardly to the extent permitted by the limiting pin and slot connection 53. The arm 50 is right-angularly bent at its outer end as shown and is drilled to provide for the mounting of a roller 54 which is held in place thereon by screw 55. The roller is adapted to have engagement with the end of the control dial 45. The roller is spaced from the dial over the greater portion of its extent of movement, but a projection or cam 56 of limited peripheral extent is formed upon the edge of the skirt portion of the dial of such character that when the dial is rotated to the off position the cam is brought into engagement with the roller, and the arm 50 is depressed against the action of spring 52 moving the pin inwardly of the frame structure.

Within the frame structure there is provided an arm 58 pivoted to the frame at 59, and having connection at its lower extremity with the contact assembly 37. The arrangement is such that the extension 56 upon the control dial contacts roller 54 in the position corresponding with the off position of the control device. A pin 60 fixed to the control member is adapted to engage a fixed stop 61 to prevent the turning of the control member beyond the 550° or high heat position in one direction, and beyond the off position in the other direction.

The operation of this device is as follows. The control device 15 is adjusted to any desired temperature condition, the thermostatic device functioning to regulate the energizing and de-energizing of the heating element to maintain this desired predetermined temperature. When it is desired to shut off the oven, the control member 15 is returned to its off position and at this time cam 56 engages the roller 54 to cause the end of arm 50 to bear against lever 58, thereby retaining the contact assembly 37 in open circuit position as shown. As the temperature within the oven falls, the thermostatically controlled structure previously described may, under some circumstances, tend to effect the closing of the contacts. However this is prevented by the locking device already described, and the ribbon spring 41 permits of any movement of the thermostatically operated arm 38 without damage to the thermostat parts themselves. Thus a means is provided for positively insuring that when adjusted to off position the heating element will be permanently maintained or locked in this de-energized position. Further this means in the preferred embodiment illustrated is directly incorporated with the thermostat control itself so that the entire mechanism is operable from a single control dial, avoiding the use of auxiliary line switch mechanism and the like. Nevertheless a definite disconnection of the oven elements from the power source is provided and maintained, and in the case where a double pole thermostat such as shown is used, this arrangement provides for definitely opening and maintaining disconnected both sides of the line, thus assuring that the oven baking element will be positively disconnected from both sides of the line at all times with the control element in off position. With the arrangement of the present invention it is further not necessary that the thermostat be adjustable to a low temperature position, such as to a temperature below room temperature. The thermostat adjustment need provide only for adjustment over the desired range of operating temperatures and to the check or initial setting position which may be a room temperature condition, or above as desired. Adjustment of the thermostat as such beyond this range is not required, the thermostat contacts being positively locked in the open circuit position with the control member in the off position.

The stove is preferably also provided with a broiler element which may be located in the same compartment with the baking elements or in a separate compartment as desired. Means are provided for preventing simultaneous energization of the broiling element with the baking elements. This is desirable in the case where both elements are located in the same compartment, in order to prevent introduction of excessive heat into this single compartment. And this arrangement is further desirable in certain cases even where the elements are located in separate compartments, in view of the fact that both baking and broiling elements are of relatively high capacity and an added rate for electricity is sometimes charged where both elements can be energized at the same time. This throws an added load upon the line requiring the use of heavier wiring and the like. And since it is seldom that broiling and baking operations are desired to be carried out at the same time it is desirable to limit the operation so that only one circuit can be energized at once.

This means comprises the switch element 70 which has a plurality of operative positions. In one position as shown by the dotted line connections, the outside wires of the three wire power line 71 is connected to broiler contacts 72 so that the broiler element 73 is energized. In this condition the current is entirely cut off from the baking elements, so that they cannot be energized simultaneously with the broiler elements. When the switch 70 is turned to its alternative position, the circuit is completed through the baking element contacts 74, energy then being supplied through the thermostatic switches 36, 37 which are controlled and operated in the manner already described. As also shown in this circuit diagram there is preferably provided in the baking oven circuit, a series coil 75 across which is connected the small voltage pilot indicating lamp 76. This is desired so that a proper indication is available when the oven circuit is closed and the heating coils energized. Also preferably as shown the oven baking units are divided into an upper element 77 of smaller heat capacity and a lower element 78 of larger heat capacity in order to provide for maintenance of a substantially balanced temperature condition within the oven. These elements can be connected in series or in parallel as desired in accordance with the design and other characteristics of the oven, and are preferably controlled simultaneously by the same control mechanism. As shown the cooking top elements 79, usually of smaller capacity are connected preferably between the neutral wire and alternate outside wires of the three wire power source.

Instead of providing a separate broiler and oven control switch, the invention also provides for securing the desired interlocking action of the broiler and baking element circuits, with means to effect the selective operation thereof, from a single control member. An embodiment of this means is illustrated in Figs. 6 to 8, in which similar reference numerals have been used to indicate parts corresponding to those already described.

In this construction there is provided the heat responsive element 20, the thermostat structure 24 and the control 15 therefor, including the positively actuated means for locking open the thermostat switch contacts in the off position of the control handle. In addition there is provided upon the side of the thermostat housing 24 a broiler switch assembly indicated generally at 85. This assembly includes an insulating plate 86 supported by suitable means 87 from the housing 24, and carrying a pair of stationary line contacts 88. A movable contact assembly including insulating plate 89 carrying contacts 90 is mounted upon a sliding bar 91 for movement into circuit opening and closing position with respect to fixed contacts 80. Suitable guideways 92 guide the bar in a longitudinal direction, and spring 93 tends to move the contact assembly 89 into circuit closing position.

At its outer end the bar 91 carries a pivot pin 94 on which is rotatably mounted a roller 95. This roller is adapted to engage the inner edge of the skirt portion 45 of the dial throughout the greater portion of its range of movement, and when so engaged effects the spacing of the movable contact assembly into open circuit position. When the dial is so turned as to bring cam 56 into engagement with the roller 95 the contacts are merely spaced somewhat farther apart.

The dial is formed with a recessed portion 96 at one point in its periphery, and when this recess is brought opposite roller 95, the roller is allowed to drop into the recess under the action of spring 93, and the contacts are closed upon each other, effecting the energizing of the broiler element which is connected to contacts 90, from the power source which is connected to contacts 88. The dial is provided with a "broil" position located beyond the off position, the arrangement being such that when the broil position is brought in line with the index the roller 95 is seated within a recess 96, and the broiling circuit is closed. Cam 56 is formed of sufficient peripheral extent that it maintains engagement with roller 54, to lock the thermostat contacts of the bake oven circuit in open position both in the off position and in the broil position of the control member. If desired the cam member may be slightly dished so that when the control handle is turned to off position roller 54 will seat therein giving suitable indication to the operator of the accurate positioning of the control handle. Suitable means are provided as described above for preventing rotation of the control handle beyond the broil position in one direction, and beyond the highest heat position in the other direction.

This arrangement thus provides in a highly simple and effective manner a single control device for effecting the adjustment of the temperature responsive parts to a desired temperature condition. It further provides for positively locking open the thermostat contacts, and thus insuring the positive disconnection of the baking element from the power source when the control member is in off position. And it further provided for a control from the same member of the broiling element circuit, providing for the energizing of the broiling element only when the baking element is positively disconnected from the power source, and conversely providing for the energizing of the baking element only when the broiling element is positively disconnected from the power source.

Cross-reference is made to applicants' copending Patent No. 2,079,618 issued May 11, 1937, upon an application filed concurrently herewith and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an oven of the character described a heating arrangement comprising a heating element and a heat responsive device located within the oven, switch means for regulating the operation of said heating element to effect the heating of the oven to a desired temperature, adjustable operating means for said switch means controlled in response to said heat responsive device, means adjustable from an off position to a plurality of operative positions for adjusting said operating means to vary the temperature to which said oven is regulated, and means actuated by said adjusting means as it is moved into said off position for preventing control of said switch means by said heat responsive device and providing for maintaining said heating element in inoperative condition.

2. An electric heating arrangement for an oven of the character described adapted to be connected to a power source comprising a heating element energizable from said power source for supplying heat to said oven, a heat responsive element responsive to the heat of said oven, switch means, yieldable means for effecting actuation of said switch means in response to said heat responsive element to maintain a predetermined temperature within the oven, control means providing for adjustment of the temperature to which the oven is regulated over a range of temperature conditions, and means operative in one position of adjustment of said control means for positively locking said switch means in open circuit position, said yieldable means providing for unimpaired movement of said heat responsive element while said switch means is maintained in said open circuit position.

3. An electric heating arrangement for an oven of the character described adapted to be connected to a power source comprising, a heating element energizable from said power source for supplying heat to said oven, a switch for controlling the energizing of said heating element, thermostatic means responsive to the temperature within said oven, switch operating means for effecting operation of said switch in response to said thermostatic means to maintain a desired oven temperature, means operable from an off position to a plurality of temperature positions for adjusting said switch operating means to cause actuation of said switch at a preselected position of said thermostatic means to maintain a desired oven temperature, and additional means actuated by said adjusting means as it is moved into said off position, for positively maintaining said switch in open circuit position.

4. An electric heating arrangement for an oven of the character described adapted to be connected to a power source comprising a plurality of heating elements energizable from said power source for supplying heat to said oven, switch means for controlling the energizing of one of said elements, thermostatic means responsive to the temperature within the oven for effecting operation of said switch means to maintain a desired oven temperature, means for positively maintaining said switch means in open circuit position, a second switch means controlling the energizing of another of said heating elements, and means for preventing the simultaneous closing of said switch means.

5. An electric heating arrangement for an oven of the character described adapted to be connected to a power source comprising baking and broiling elements energizable from said power source, switch means for controlling the energizing of said baking and broiling elements, thermostatic means responsive to the temperature within the oven for effecting operation of said switch means to control the energizing of said baking element to maintain a desired oven temperature, means operable from an off position to a plurality of temperature positions for adjusting said thermostatic means to maintain a desired oven temperature, means operable in the off position of said adjusting means for positively maintaining said baking element switch in open circuit position, and means also controlled from said adjusting means for controlling the energizing of said broiling element and preventing simultaneous energizing of said baking element and said broiling element.

6. An electric heating arrangement for an oven of the character described adapted to be connected to a power source comprising baking and broiling elements energizable from said power source, thermostatic switch means responsive to the temperature within the oven for controlling the energizing of said baking element, a control member adjustable to a plurality of temperature positions for regulating the temperature within said oven to a predetermined desired value, means operable in a predetermined position of said control means for positively maintaining said thermostatic switch means in open circuit position, and means operable by said control member while said baking element is maintained in deenergized position providing for the energizing of said broiling element.

7. An electric heating arrangement of the character described adapted to be connected to a power source comprising a heating element energizable from said power source for supplying heat to a heating zone, a switch for controlling the energizing of said heating element, thermostatic means responsive to the temperature within said zone, a frame structure supporting said switch means and said thermostatic means in fixed positioning with respect to each other, switch operating means cooperating with said thermostatic means and adjustable with respect to said frame for effecting operation of said switch in response to a predetermined positioning of said thermostatic means, means operable from an off position to a plurality of temperature positions for adjusting said switch operating means with respect to said frame to predetermine the position of said thermostatic means at which operation of said switch means is effected to maintain a desired temperature in said heating zone, and additional means operable in the off position of said adjusting means for positively maintaining said switch in open circuit position.

8. An electric heating arrangement of the character described comprising a heating element and a heat responsive device located within the heating zone, double pole switch means for regulating the operation of said heating element to effect the heating of said zone to a desired temperature, adjustable operating means providing for actuation of said switch means under control of said heat responsive device, means movable from an off position to a plurality of operative positions for shifting said adjustable operating means with respect to said switch means and said heat responsive device to vary the temperature to which said heating zone is regulated, and means actuated by said adjusting means in said off position for preventing control of said switch means by said heat responsive device and providing for maintaining said heating element in inoperative and disconnected condition.

9. An electric heating arrangement of the character described adapted to be connected to a power source, a heating element, a heat responsive device located in the heating zone, a double pole switch means including a plurality of stationary contacts adapted to be connected to said power source and to said heating element, and bridging means for said contacts movable to closed and open circuit position with respect thereto, operating means for said switch bridging means actuated in response to said heat responsive device, means adjustable from an off position to a plurality of operative positions for adjusting and predetermining the temperature at which said heat responsive device effects actuation of said bridging member to vary the temperature to which said heating zone is regulated, and means operated by said adjusting means in the off position thereof for preventing control of said switch bridging means by said heat responsive device and providing for maintaining both sides of said power source disconnected from said heating element.

BERTRAND B. KAHN.
CARL J. HAKE.